(No Model.) 9 Sheets—Sheet 1.

C. W. ARNOLD.
FRINGE KNOTTING MACHINE.

No. 586,413. Patented July 13, 1897.

Witnesses:
Will. A. Barr.
F. D. Goodwin

Inventor
Clarence W. Arnold
by his Attorneys
Howson & Howson (No Model.)

9 Sheets—Sheet 3.

C. W. ARNOLD.
FRINGE KNOTTING MACHINE.

No. 586,413.

Patented July 13, 1897.

Witnesses:
Will A. Bass.
F. D. Goodwin

Inventor:
Clarence W. Arnold
by his Attorneys
Howson & Howson (No Model.) 9 Sheets—Sheet 4.
C. W. ARNOLD.
FRINGE KNOTTING MACHINE.

No. 586,413. Patented July 13, 1897.

Witnesses:
Will. A. Barr.
F. D. Goodwin.

Inventor:
Clarence W. Arnold
by his Attorneys
Howson & Howson (No Model.)　　　　　　　　　　　　　　　　9 Sheets—Sheet 5.
C. W. ARNOLD.
FRINGE KNOTTING MACHINE.

No. 586,413.　　　　　　　　　Patented July 13, 1897.

Witnesses:
Will. A. Barr.
F. D. Goodwin

Inventor:
Clarence W. Arnold
by his Attorneys
Howson & Howson

THE NORRIS PETERS CO., PHOTO-LITHO., WASHINGTON, D. C.

(No Model.) 9 Sheets—Sheet 7.

C. W. ARNOLD.
FRINGE KNOTTING MACHINE.

No. 586,413. Patented July 13, 1897.

Witnesses:
Will. A. Barr
F. D. Goodwin

Inventor:
Clarence W. Arnold
by his Attorneys
Howson & Howson (No Model.)
9 Sheets—Sheet 8.

C. W. ARNOLD.
FRINGE KNOTTING MACHINE.

No. 586,413.
Patented July 13, 1897.

Witnesses:
Will. A. Barr.
F. D. Goodwin

Inventor:
Clarence W. Arnold
by his Attorneys
Howson & Howson (No Model.) 9 Sheets—Sheet 9.
C. W. ARNOLD.
FRINGE KNOTTING MACHINE.
No. 586,413. Patented July 13, 1897.
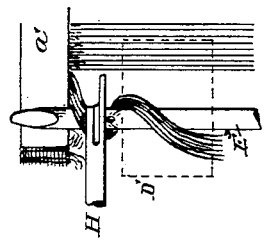
FIG. 12.
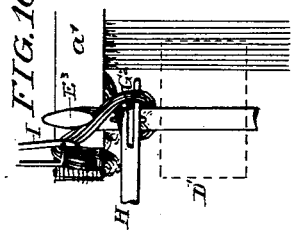
FIG. 16.
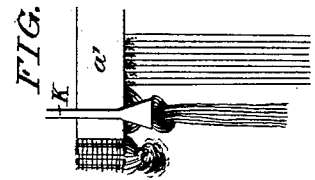
FIG. 20.
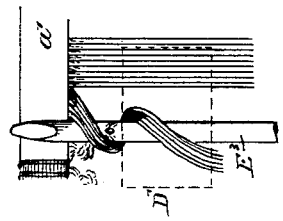
FIG. 11.
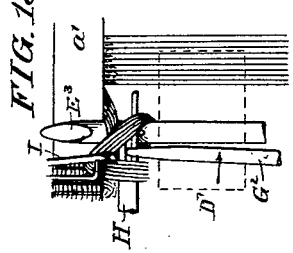
FIG. 15.
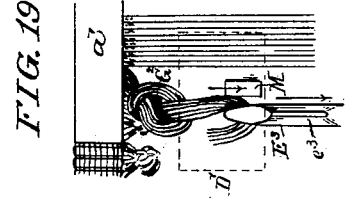
FIG. 19.
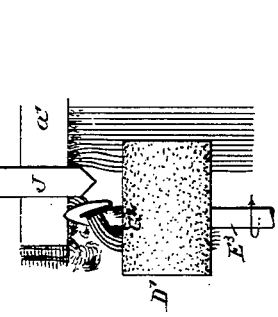
FIG. 10.
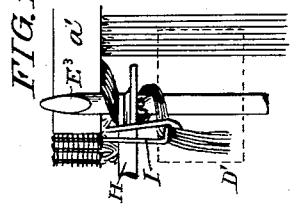
FIG. 14.
FIG. 18.
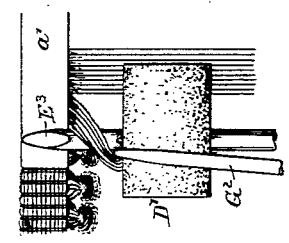
FIG. 9.
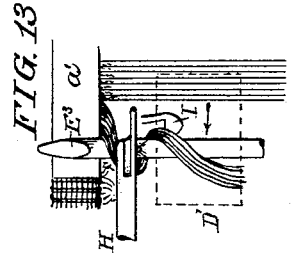
FIG. 13.
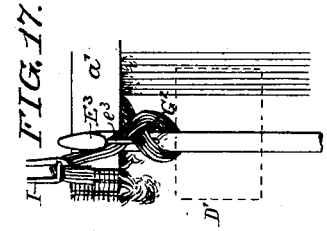
FIG. 17.
Witnesses:
Will O. Barr.
F. D. Goodwin.
Inventor:
Clarence W. Arnold
by his Attorneys
Howson & Howson

UNITED STATES PATENT OFFICE.

CLARENCE W. ARNOLD, OF PHILADELPHIA, PENNSYLVANIA.

FRINGE-KNOTTING MACHINE.

SPECIFICATION forming part of Letters Patent No. 586,413, dated July 13, 1897.

Application filed March 11, 1896. Serial No. 582,813. (No model.)

*To all whom it may concern:*

Be it known that I, CLARENCE W. ARNOLD, a citizen of the United States, residing in Philadelphia, Pennsylvania, have invented certain Improvements in Fringe-Knotting Machines, of which the following is a specification.

The object of my invention is to construct a machine for knotting fringe which has been previously woven having a head and depending strands. It will be understood, however, that my invention may be combined with a machine for weaving the fringe without departing from my invention.

Figure 1:
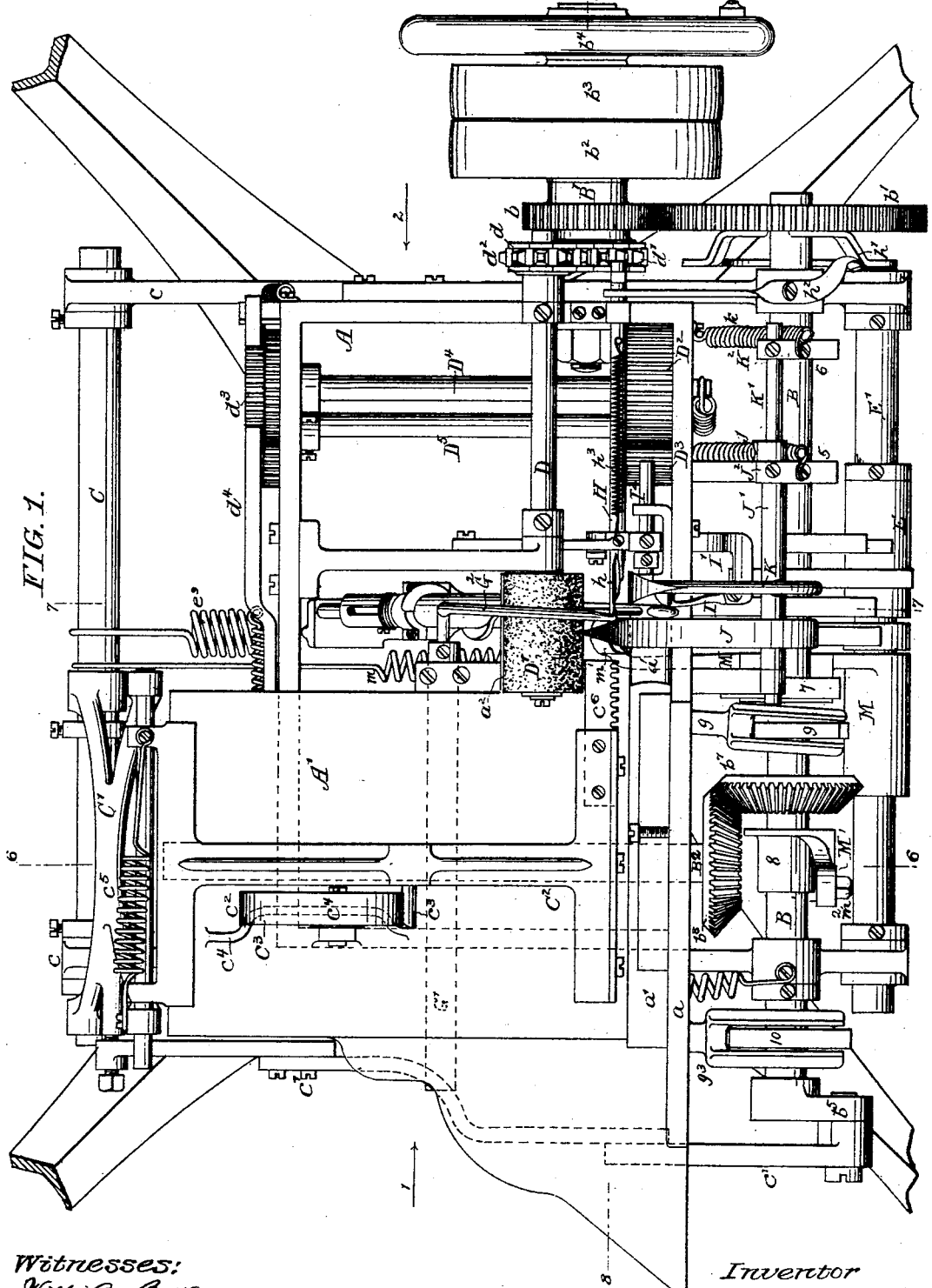
Figure 2:
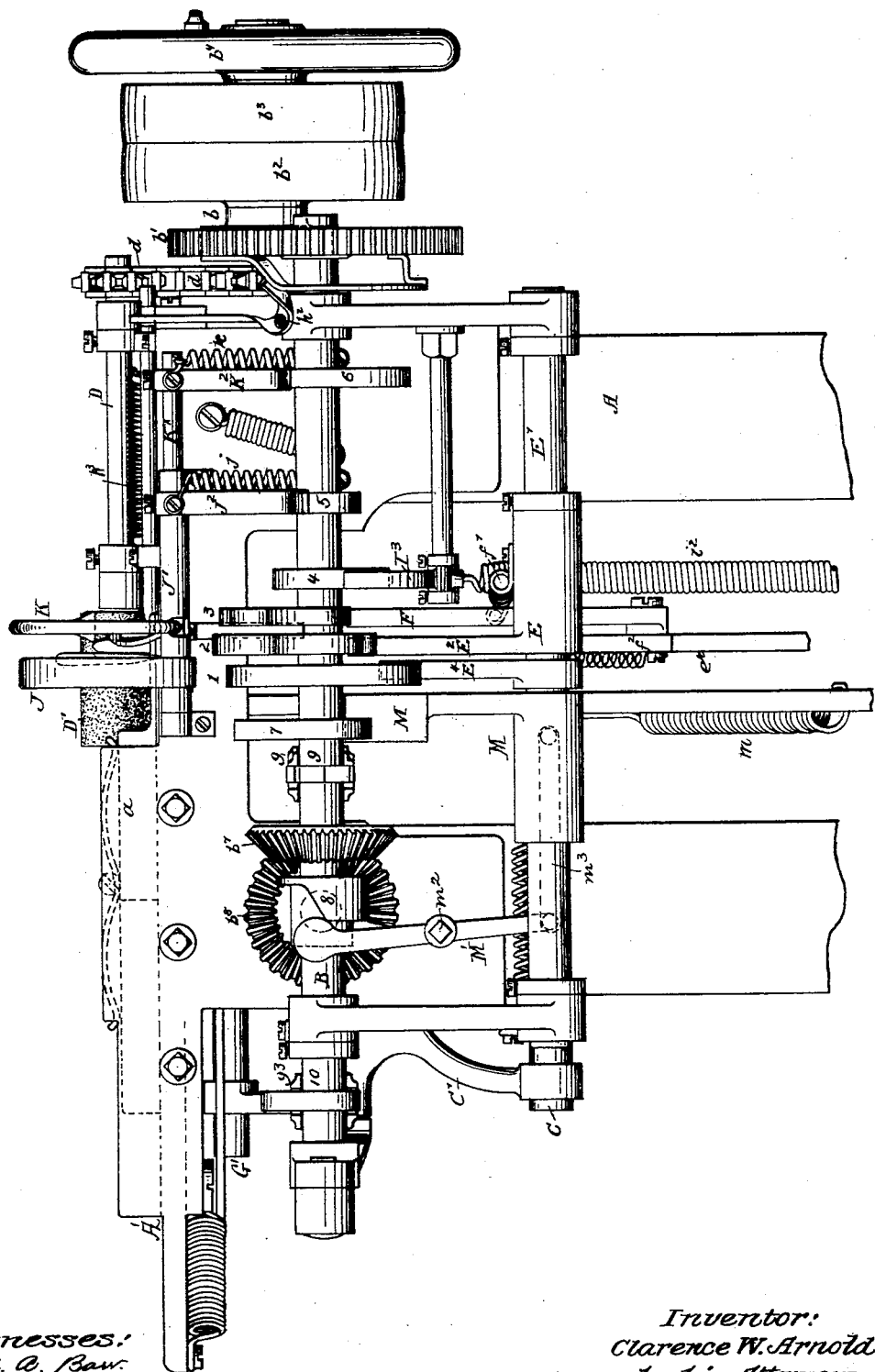
Figure 3:
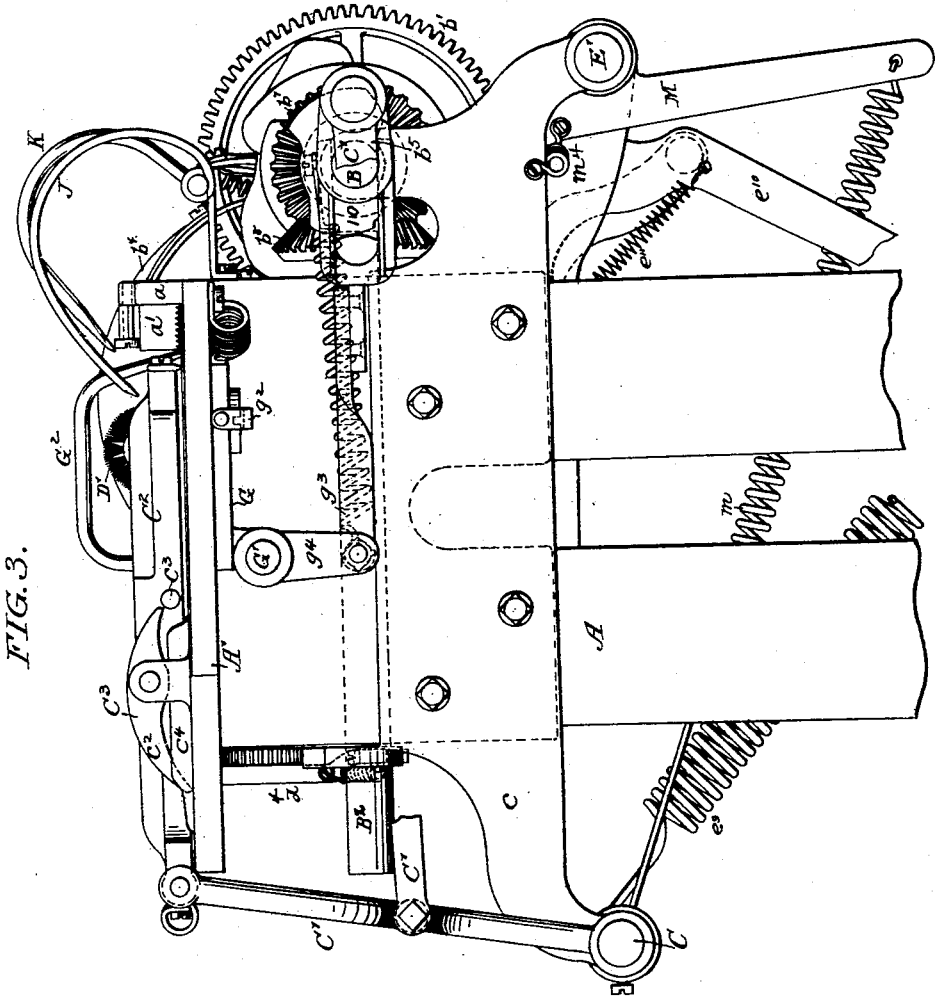
Figure 4:
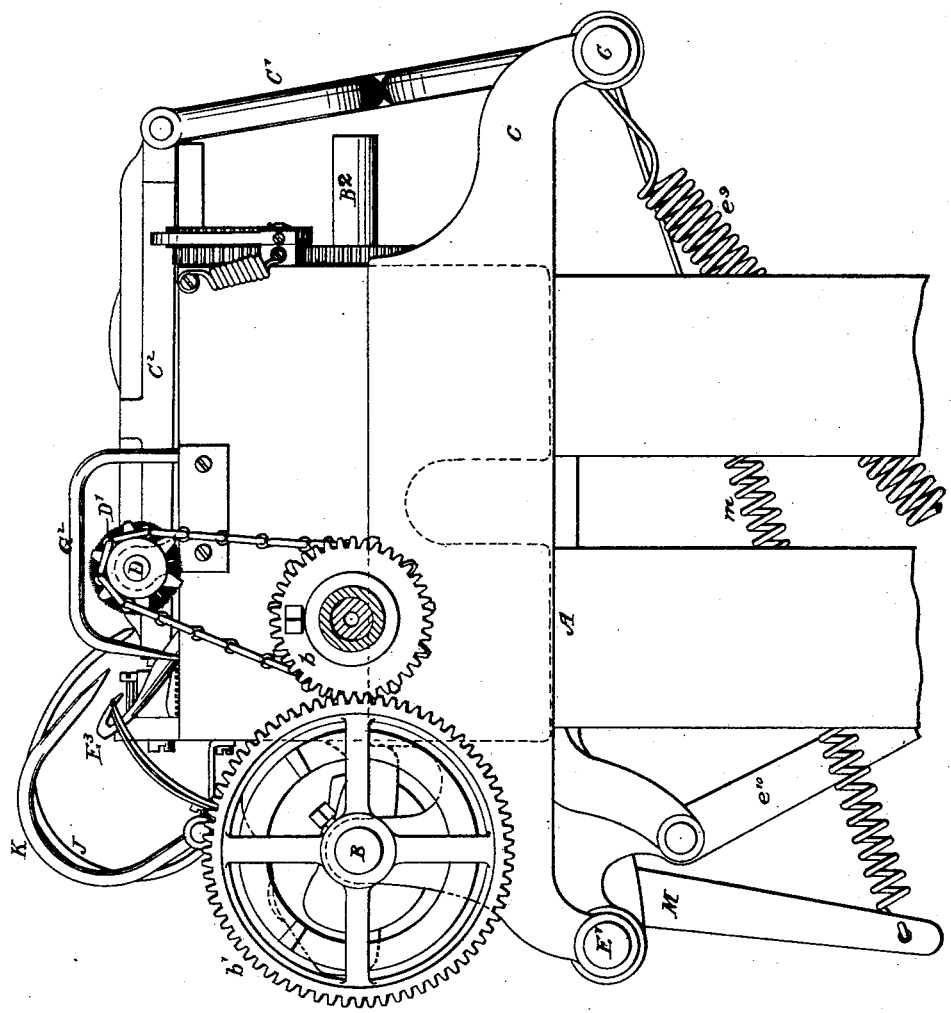
Figure 5:
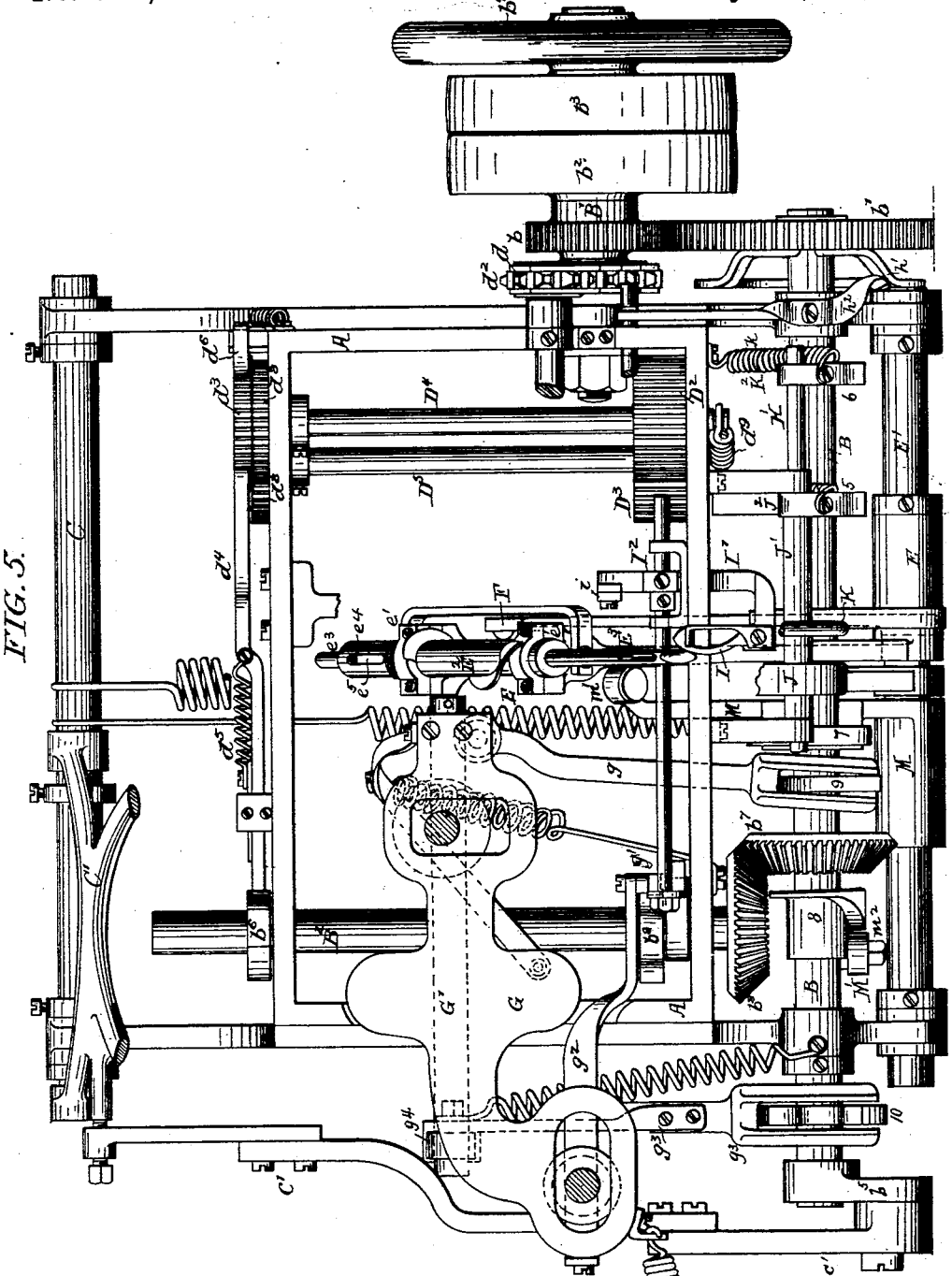
Figure 6:
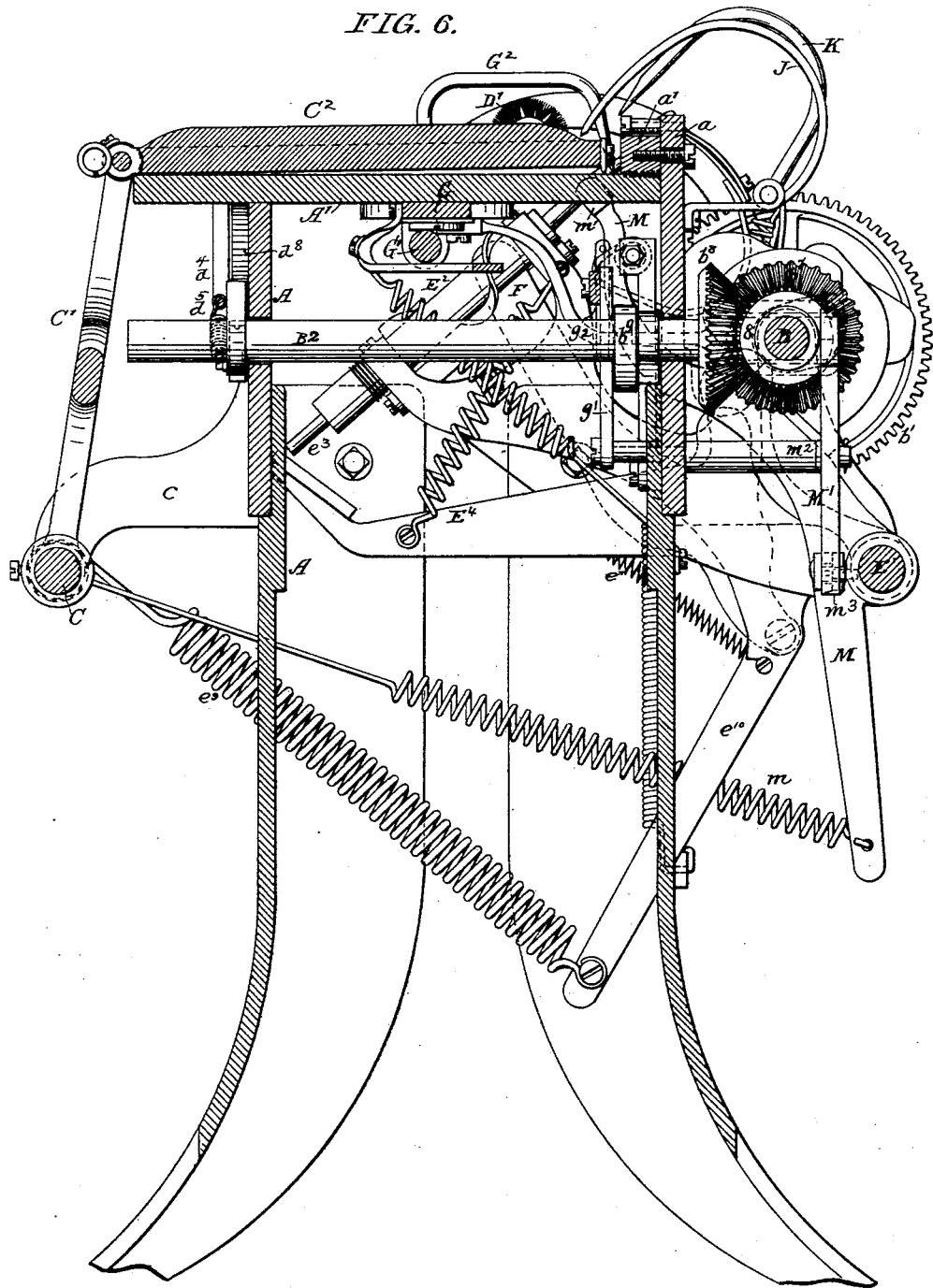
Figure 7:
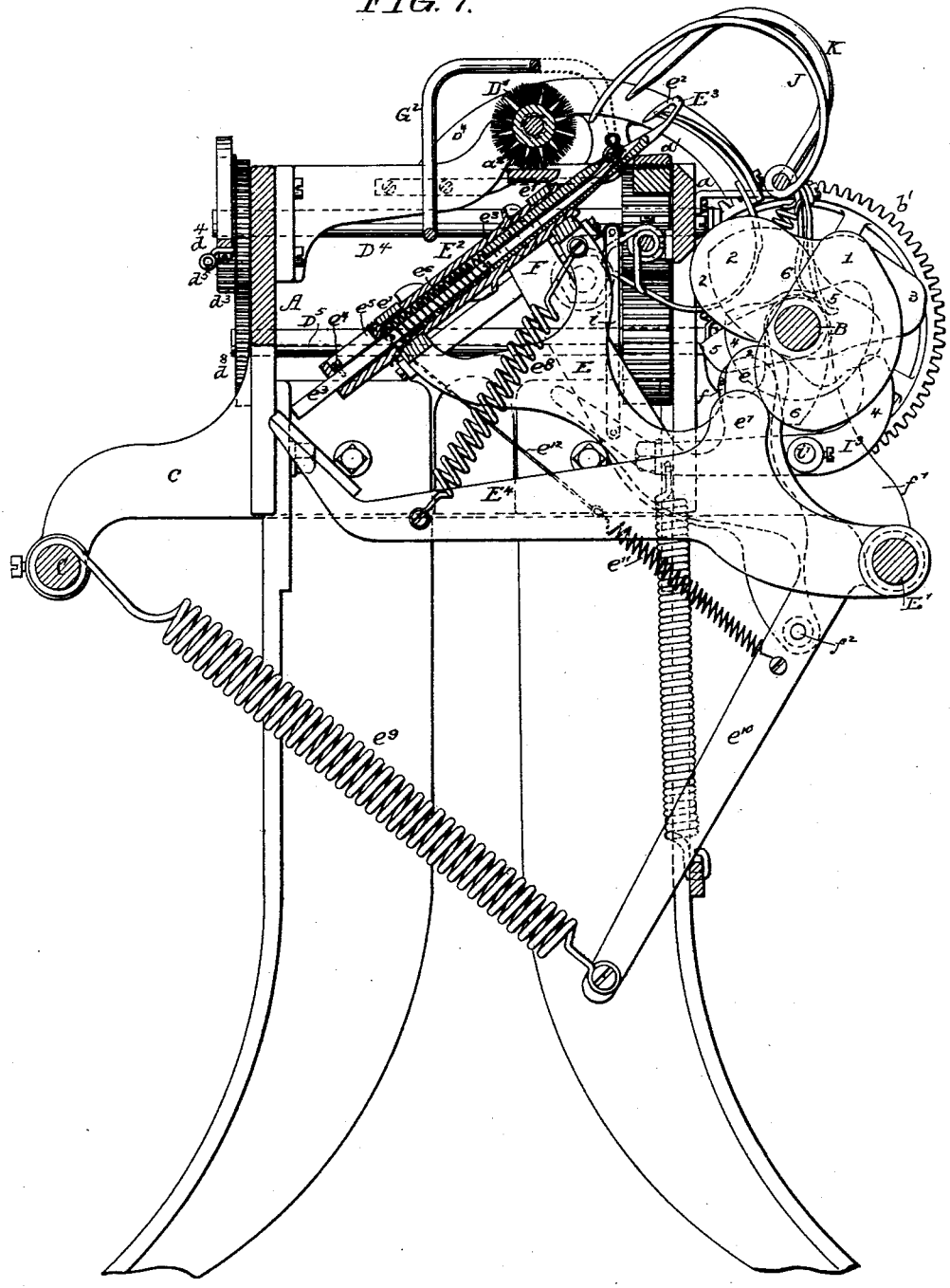
Figure 8:
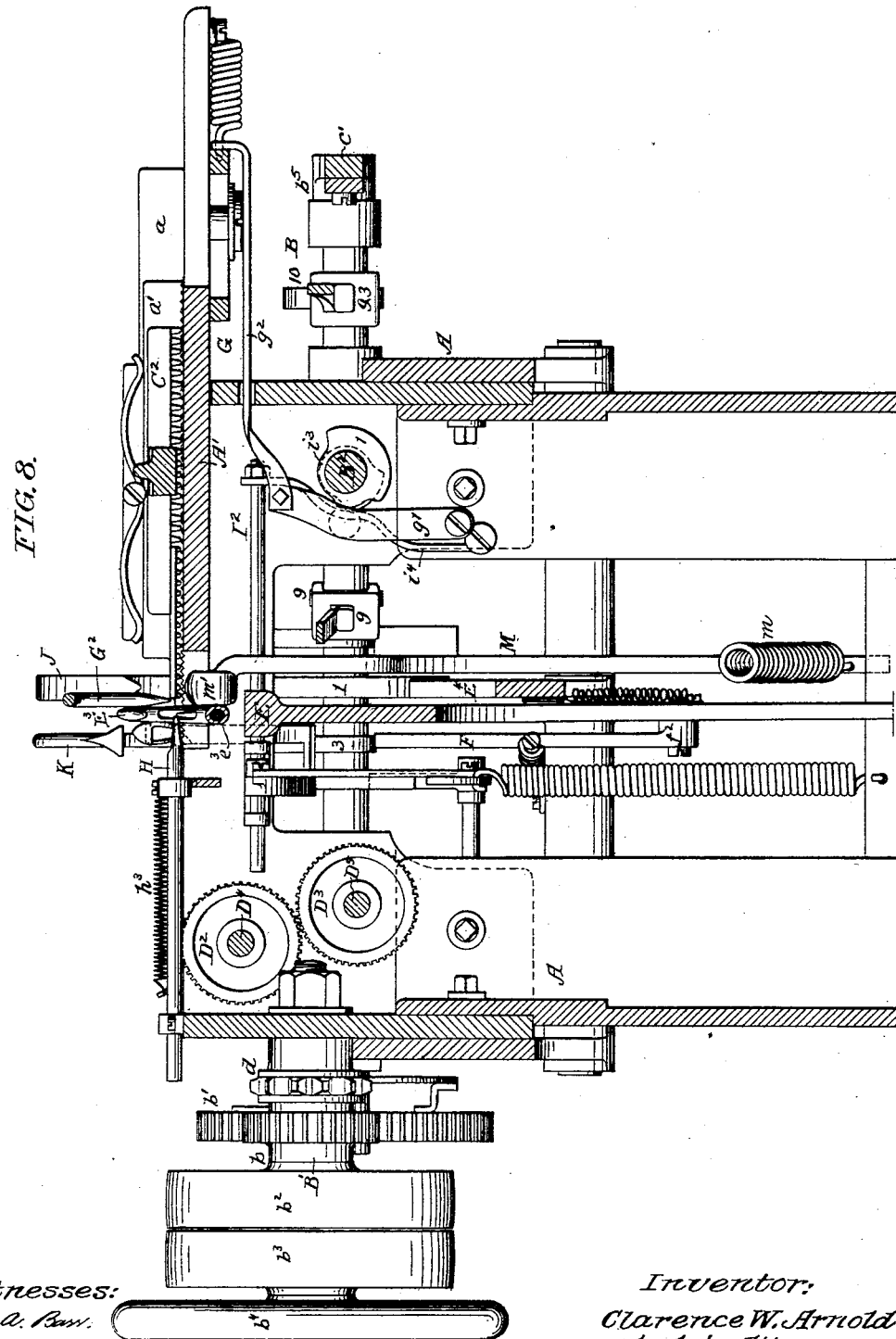

In the accompanying drawings, Figure 1 is a plan view of my improved knotting-machine. Fig. 2 is a side view. Fig. 3 is an end view looking in the direction of the arrow 1, Fig. 1. Fig. 4 is an end view looking in the direction of the arrow 2, Fig. 1, with the belt-wheels removed. Fig. 5 is a sectional plan view to illustrate the needle mechanism. Fig. 6 is a transverse section on the line 6 6, Fig. 1. Fig. 7 is a transverse section on the line 7 7, Fig. 1. Fig. 8 is a longitudinal sectional view on the line 8 8, Fig. 1. Figs. 9 to 20, inclusive, are diagram views illustrating the method of forming the knot.

I will first describe the operation of the machine in general.

The fringe having the head and the depending loose ends is fed to the machine and under the heading-clamp, at which point it is combed out so as to present the loose ends to the separator in such a manner that they will be parallel with each other and at right angles to the heading. The selector separates a number of the loose ends according to the number required for the bunch and feeds them independently to the knotting mechanism, which consists of a needle and rod around which the strands are twisted and a hook which draws the strands in such a manner as to form the knot. After the knot is formed the heading is moved forward so that the selecting mechanism may engage another series of loose ends. The feeding mechanism for the fringe grips the heading after its loose ends have been knotted.

I will now describe in detail the construction of the apparatus.

A is the frame of the machine.

$A'$ is the combing-table, secured rigidly to the frame. The fringe passes over the table to the knotting mechanism. The table has a flange $a$ acting as a guide for the head of the fringe, and secured to the flange is a clamp-block $a'$, which rests upon the heading, and between the block and a stud on the flange $a$ is a spring having sufficient tension to keep the fringe in place during the combing out, selecting, and knotting operations. The presser and combing table extends to a point on a line with the knotting mechanism, so that the fringe is held rigidly until knotted.

B is a cam-shaft, (clearly shown in Fig. 2,) and extending the full length of the machine and on this shaft are the several cams for operating the several independent elements of the machine. This cam-shaft is driven by gearing $b$ $b'$ from the driving-shaft $B'$, having fast and loose pulleys $b^2$ $b^3$, and on this shaft is a hand-wheel $b^4$, so that the operator can turn the mechanism by hand when necessary. The driving-shaft is hollow in the present instance and adapted to a stud secured to the frame of the machine.

On the opposite side of the machine are brackets $c$ $c$, in which is mounted a fixed shaft C, and pivoted to this shaft is a frame $C'$, which extends to the combing-table, and pivoted to the frame $C'$ is a comb-frame $C^2$, extending over the table $A'$. On the end of this frame are a series of teeth forming the comb and which engage with the loose ends of the fringe and draw them out in a direct line from the heading-clamp.

The frame $C'$ is connected to a crank $b^5$ on the cam-shaft B by a connecting-rod $c'$, so that as the cam-shaft revolves the frame will have an oscillating motion.

Mounted on the combing-table $A'$ is a cam-lever $C^3$, and this lever is so pivoted that the end $c^2$ will normally rest upon the table, and on the comb-frame $C^2$ is a pin $c^3$, which extends in the path of its lever, so that on the forward motion of the comb-frame it will ride over the lever and loose ends of the fringe and will come in contact with the fringe near the heading, and on its return the comb will engage the loose ends and draw them out. As the comb returns its pin comes in contact with a cam $c^4$ on the combing-table and will have a motion which will move it toward the knotting mechanism as it is drawing back, so that it will pull the fringe in a direct line, as the feeding mechanism for the head is acting at the same time. Thus a new series of ends is presented to the selecting mechanism.

The comb-frame is returned to its normal position by a spring $c^5$, Fig. 1, as soon as the pin $c^3$ passes the cam $c^4$, the spring retaining the comb-frame in the normal position, so that it will pass over the lever $C^3$ on its forward stroke.

I preferably rib the under side of the cam-block $a'$ as well as the table under the clamp-block, so that the fringe will be held rigidly when combed, separated, and knotted. The clamp-block is held to the flange $a$ by screws adapted to openings in the flange, so that while the block is free to move vertically it cannot move away from the flange.

Mounted in bearings on the frame is a shaft D, having a rotary brush $D'$ at the end, directly above an extension $a^2$ of the table. This shaft D is driven from the main shaft by a chain $d$ passing over the sprocket-wheel $d'$ and over a sprocket-wheel $d^2$ on the shaft D. Thus this shaft is driven at all times, so that the loose ends as they are combed are passed under the brush and kept in line to be separated and knotted. The end of the comb $c^6$ is reduced, so as to pass between the brush and extension $a^2$ on its return movement. The comb passes over the brush in its forward movement.

$D^2$ $D^3$ are feed-wheels for the fringe. The heading passes around the wheel $D^2$ and between it and the wheel $D^3$, and these wheels are mounted on shafts $D^4$ $D^5$, having their bearings in the frame of the machine, and the wheel $D^4$ has a ratchet-wheel $d^3$, engaged by a pawl $d^4$, moved forward by a cam $b^6$ on a cross-shaft $B^2$, driven from the cam-shaft B by bevel-wheels $b^7 b^8$. The pawl $d^4$ is returned by a spring $d^5$, Fig. 5.

Engaging with the ratchet-wheel $d^3$ is a stop-pawl $d^6$ to prevent the wheel from turning backward. The shaft $D^4$ is geared to the shaft $D^5$ by wheels $d^8$ $d^8$. Thus the feed is so timed that it will be intermittent and will take place during the time of combing out the loose ends of the fringe, the knotting mechanism being free during this interval, so that a new set of ends will be presented.

The lower shaft $D^5$ is loose in its bearing, so that its wheel $D^3$ will be kept in contact with the wheel $D^2$ by a spring $d^9$, coupled to the shaft; but in case the heading should be increased in thickness at a point the lower shaft will yield and allow the heading to pass without affecting the working of the machine.

I will now describe the mechanism for forming the loop in the loose ends of the fringe.

Referring to Fig. 7, E is the needle-carrier, pivoted to the fixed shaft E, situated under the cam-shaft B. This needle-carrier has a projection $e^2$ on which the cam 2 acts. This cam is secured to the shaft B, so that the needle-carrier moves toward and from the heading of the fringe.

$E^2$ is a sleeve adapted to the bearings $e'$ of the carrier, and this sleeve has a screw formed on its exterior surface against which acts the arm F, pivoted at $f^2$ to the arm $e^{10}$ of the carrier E, and has a projection $f^3$, acted upon by the cam 3. This arm has a movement in the same direction as the needle-carrier E, but moves at a different time. On the movement of this arm the needle will turn so that its hook will engage the loose ends of the fringe and partly form the loop.

The needle proper, $E^3$, has a hooked end $e^2$ and is carried by the sleeve $E^2$, but has a movement within the needle and sleeve, as shown clearly in Fig. 7, so as to close the hooked end, and thus allow the needle to draw the loose end of the fringe through the formed loop and thus complete the knot. This latch is limited in its movement by a pin or screw $e^4$, adapted to a way $e^5$ in the sleeve $E^2$, and the spring $e^6$ tends to retract the latch. The latch is moved forward by a lever $E^4$, also pivoted to the shaft $E'$, and this lever has a projection $e^7$, which is in the path of the cam 1. The end of the lever $E^4$ acts upon the end of the latch $e^3$ and, as indicated by its cam, closes the hooked end of the needle during a certain time in the formation of the knot.

A spring $e^8$ tends to keep the lever $E^4$ in contact with its cam, while the spring $e^9$, which is attached to an arm $e^{10}$ of the carrier E, tends to keep the carrier in contact with its cam, while the spring $e^{11}$ tends to keep the arm F against its cam.

The needle is turned in one direction by a spring $e^{11}$, which is connected to the arm $e^{10}$, and has a cord $e^{12}$, which is wrapped around the shank of the sleeve $e^2$, so that while the arm F turns the needle in one direction the spring retracts it as it is released by the arm.

G is a frame mounted under the table $A'$, and adapted to bearings on this frame is a shaft $G'$, having at one end the selecting-pin $G^2$. The frame is so acted upon by cams that its pin will select the number of loose ends to be tied together in the knot and will carry them over the projected needles, so that they will be engaged by the hook of the needle when it is retracted before it is turned.

The frame G has two movements, one a longitudinal movement and the other a movement toward and from the heading-guide. The latter movement is accomplished through the medium of the cam 9 on the shaft B acting upon a rod $g$, pivoted to the forward end of the frame G. The longitudinal movement of the frame G is accomplished by the cam $b^9$ on the cam-shaft $B^2$, which acts upon the lever $g'$, pivoted to the frame of the machine, and connected to the frame G by a connecting-rod $g^2$. The selecting-pin $G^2$ is mounted on the shaft $G'$, which is actuated by a cam 10, acting against a rod $g^3$, connected to a lever $g^4$ on the shaft $G'$, so that the selector-pin is raised and lowered at the proper time.

Suitable springs keep the rods $g$ and $g^3$ and the lever $g'$ against the cams. Thus as the brush D' rotates it brushes out the loose ends of the fringe that pass from the comb, and the selecting-pin selects a number of the loose ends and draws them over the needle which has moved forward.

H is a reciprocated rod, and this rod has at its end a channel $h$ for the reception of the point of the selector-pin $G^2$, so that when the loose ends are drawn over this bar the selector-pin can move a portion of the loop to one side of the needle so that the ends will be in the hooked portion of the needle. The rod H is moved longitudinally by a cam $h'$ on the wheel $b'$. This cam acts against the lever $h^2$, pivoted to the frame of the machine, and this lever engages the rod and tends to draw it away from the path of the needle. A spring $h^3$, connected to the rod, tends to keep the lever $h^2$ in contact with the cam.

I is a friction-hook, which engages the series of ends and carries them over the rod H and into the hook of the needle, the presser-bar holding the threads in such frictional contact with the hook that they cannot become accidentally detached from the hook, but must be drawn out of the hook by the needle as it is drawn down. The friction-hook is carried by an arm I', which is secured to a shaft $I^2$, adapted to bearings on the frame of the machine. The arm extends beyond this shaft and is connected by a rod $i$ to a lever $I^3$, pivoted on a stud $i'$, projecting from the frame of the machine, and the opposite arm of this lever is acted upon by a cam 4 on the shaft B. A spring $i^2$ tends to keep the lever in contact with its cam. The shaft $I^2$ has also a longitudinal movement so as to bring the hook I near the path of the needle. This is accomplished by a cam $i^3$ on the cross-shaft $B^2$ acting on the lever $i^4$, spanning the shaft $I^2$, so that the hook not only has a movement toward the fringe, but has a longitudinal movement as well.

J is a spreader for separating the selected ends from the balance that remain under the control of the brush, and this spreader has a motion toward and from the fringe and is carried by a sleeve J', mounted on the shaft K'. This sleeve is adapted to bearings on the frame of the machine and has an arm $J^2$, acted upon by a cam 5. A spring $j$ tends to keep the arm $J^2$ against the cam.

K is an arm having the same movement as the arm J, but actuated by a cam 6, through the medium of the shaft K' and arm $K^2$, the sleeve J' being partially cut away to permit of the attachment of the arm K directly to the shaft K', so as to have a movement independent of the arm J. A spring $k$ tends to keep the said arm against the cam. The arm K forces the knotted ends down out of the path of the needle after they are formed, so that the knotted bunch will not interfere with the forming of the succeeding knot.

M is a presser-lever, which holds the loose ends of the fringe against the needle as it is drawn down and after the ends are drawn from the friction-hook, this lever moving with the needle until the knot is formed.

The movement with the needle is accomplished by a cam 7 on the shaft B, which acts upon the lever M, hung to the shaft E', so that it can slide longitudinally thereon. A spring $m$ returns the lever and keeps it always in contact with the cam. The presser-lever has a head $m'$, which presses against the ends at the hook of the needle and is forced against the needle by a cam 8 on the shaft B. This cam acts upon a lever M', pivoted at $m^2$ and connected to the lever M by a rod $m^3$. The pressure is withdrawn by a spring $m^4$.

Referring to Figs. 9 to 20, inclusive, the knot is formed as follows: The loose ends of the fringe are combed and brushed out and the heading, with its fringe, is fed forward. The needle then moves up to the position shown in Fig. 9 and the selector-pin $G^2$ selects a bunch of ends from the fringe and then moves across the path of the needle, so as to place the ends across the needle to be engaged by its hook. The brush D', rotating continuously, keeps the ends always under tension. The spreader J enters the space between the selected ends and the unselected ends, so as to make a positive separation. The hooked needle then retracts and its hook engages the strands laid across the needle by the selector-pin $G^2$, as shown in Fig. 10. The needle then makes a full turn to the right, wrapping the strands around its shank, as shown in Fig. 11, and moves forward again, so that its hook will be out of the way. The rod H is then projected over the needle and assumes the position shown in Fig. 12. The friction-hook I then moves forward from its position shown in Fig. 1 to the position shown in Fig. 13, and as it moves over the needle in the direction of its arrow, Fig. 13, it engages the end of the selected fringe and carries it over to the position shown in Fig. 14. Then it moves back, carrying with it the loose ends, withdrawing them from the control of the brush, its presser-bar holding the ends in the hook. When the hook reaches the position shown in Fig. 15, the selector $G^2$ moves forward. Its point enters the slot in the bar H. It then moves in the direction of its arrow, Fig. 15, forcing the loop to the right-hand side of the needle, as shown in Fig. 16. The friction-hook I, still retracting, places the ends in the hook of the needle, as shown in Fig. 16. The selector then moves down into the space between the needle and loop and acts as the guide for forming the knot, remaining in the loop until the knot is fully formed. When the friction-hook reaches the position shown in Fig. 17, the latch $e^3$ is projected, inclosing the ends in the hook of the needle. The needle is then retracted, drawing the ends through the loop and freeing them from the friction-hook, as shown in Fig. 18. As the needle descends the presser M moves against the ends, as shown in Fig. 19, and descends with the needle, placing sufficient friction on the ends, so that a tight knot will be formed on the selector-pin G². This pin locates the knot, so that all the knots will be on a line. After the knot is fully formed and the ends pulled through the needle the selector is raised and, as shown in Fig. 20, the arm K pushes the formed knot down out of the way of the mechanism, which then repeats the operation above described to form another knot.

The levers and arms may be modified and the springs may be arranged in different positions without departing from my invention, and it will be understood that all the cams are so timed as to bring the several elements of the machine into action at the proper time.

I claim as my invention—

1. The combination in a machine for tying knots in fringe, of the mechanism for holding the head of the fringe, devices for separating a bunch of loose ends, a hooked needle having a latch and adapted to turn to form the loop, a rod over which the knot is formed and a friction-hook adapted to hold the thread as the knot is being formed, substantially as described.

2. The combination of the heading-clamp, the brush for holding the free ends of the fringe, a selector for separating a number of ends to be tied, a friction-hook adapted to engage the free ends, a rod over which the ends are drawn by the hook and a needle for engaging the looped end, substantially as described.

3. The combination of the heading-clamp, the brush, the selector mounted above the brush, the needle, the friction-hook adjacent to the selector, an arm J for separating the threads selected extending above the selector, and a rod over which the threads are drawn, substantially as described.

4. The combination of the heading-clamp, the selector, a friction-hook, a rod over which the selected threads are drawn, a hooked needle, mechanism for rotating said needle to form the loop and mechanism for retracting the needle to draw the ends through the loop to form the knot, substantially as described.

5. The combination of the heading-clamp, the selector, a friction-hook, a rod over which the selected threads are drawn, a hooked needle, mechanism for rotating said needle to form the loop and mechanism for retracting the needle to draw the ends through the loop to form the knot, with an arm for forcing the formed knot out of the way, substantially as described.

6. The combination of a pivoted arm, a needle-casing adapted to said arm, said casing having a spiral rib and having a hooked end, a lever engaging with the rib by which the lever is turned, a rod extending through the needle-casing and forming the latch, a spring for retracting the rod, a lever for acting upon the rod to close the latch and cams actuating the several levers, substantially as described.

7. The combination in a knotting-machine, of the reciprocated hook-needle, means for rotating the same and means for reciprocating, a latch within the needle and means for closing the latch, a rod over which the loop is formed, a friction-hook, with a cam for moving said hook laterally and a cam for moving it forward at a given time, with a selector, substantially as described.

8. The combination in a knotting-machine, of the heading-clamp, the needle over which the loop is formed, a reciprocating rod, a clamping-hook for drawing the ends of the fringe over the rod, a selector for selecting the threads and placing them over the needle so that they will be engaged by its hook, a plate G to which the selector is attached, a cam for moving the plate laterally and a cam for moving the plate longitudinally, substantially as described.

9. The combination in a knotting-machine, of the heading-clamp, the mechanism for forming the knot, a comb for combing out the loose ends of the fringe, a frame C² to which the comb is attached, a frame C' to which the comb-frame is pivoted, means for reciprocating the frame C² and a cam-lever C³ which lifts the frame C² on its return movement so as to clear the threads, substantially as described.

10. The combination in a knotting-machine, of the heading-clamp, the knot-tying mechanism, a comb-frame, means for reciprocating said frame and means for moving the said frame laterally as it is drawing out the loose ends, and means for raising the frame on its return movement so as to clear the threads, substantially as described.

11. The combination in a knotting-machine, of the needle, carrier therefor, a cam for actuating the carrier, a lever for turning the needle and a cam for actuating the said lever, a selector, a shaft therefor, a frame carrying the selector-shaft, a cam for reciprocating the selector-shaft and a cam for moving the frame toward and from the heading-clamp, a shaft on which the several cams are mounted and means for rotating said shaft, substantially as described.

12. The combination in a knotting-machine, of the reciprocating and rotating needle, operating means therefor, a selector and a presser adapted to press against the ends held by the needle as the needle moves down to finish the knot, with means for actuating the said presser, substantially as described.

In testimony whereof I have signed my name to this specification in the presence of two subscribing witnesses.

CLARENCE W. ARNOLD.

Witnesses:
 WILL. A. BARR,
 JOS. H. KLEIN.